US009476126B2

(12) United States Patent
Lee et al.

(10) Patent No.: US 9,476,126 B2
(45) Date of Patent: Oct. 25, 2016

(54) METHOD FOR PRODUCING METAL-RESIN COMPLEX

(71) Applicant: ILKWANGPOLYMER CO., LTD., Goyang-si, Gyeonggi-do (KR)

(72) Inventors: Eun Kyung Lee, Goyang-si (KR); Yong Wan Jo, Iksan-si (KR)

(73) Assignee: ILKWANGPOLYMER CO., LTD., Goyang-si (KR)

(*) Notice: Subject to any disclaimer, the term of this patent is extended or adjusted under 35 U.S.C. 154(b) by 184 days.

(21) Appl. No.: 14/586,500

(22) Filed: Dec. 30, 2014

(65) Prior Publication Data

US 2016/0122879 A1 May 5, 2016

(30) Foreign Application Priority Data

Nov. 4, 2014 (KR) ........................ 10-2014-0151824

(51) Int. Cl.

| | | |
|---|---|---|
| B29C 45/14 | (2006.01) |
| C23F 1/20 | (2006.01) |
| C23F 1/36 | (2006.01) |
| C23F 1/28 | (2006.01) |
| B32B 15/08 | (2006.01) |
| C23G 1/19 | (2006.01) |
| B29K 705/02 | (2006.01) |
| B29K 105/20 | (2006.01) |
| B29K 67/00 | (2006.01) |
| B29K 305/00 | (2006.01) |
| C23F 1/22 | (2006.01) |
| C23G 1/22 | (2006.01) |

(52) U.S. Cl.
CPC ........... *C23F 1/28* (2013.01); *B29C 45/14311* (2013.01); *B32B 15/08* (2013.01); *C23F 1/36* (2013.01); *C23G 1/19* (2013.01); *B29C 2045/14868* (2013.01); *B29K 2067/006* (2013.01); *B29K 2105/20* (2013.01); *B29K 2305/00* (2013.01); *B29K 2705/02* (2013.01); *C23F 1/20* (2013.01); *C23F 1/22* (2013.01); *C23G 1/22* (2013.01)

(58) Field of Classification Search
None
See application file for complete search history.

(56) References Cited

U.S. PATENT DOCUMENTS 6,849,138 B1 * 2/2005 Kamiyama ............. C23C 22/68
148/264

FOREIGN PATENT DOCUMENTS

| JP | 2010084198 A | 4/2010 |
| JP | 2013534562 A | 9/2013 |
| KR | 1020100040260 A | 4/2010 |
| KR | 1020100063152 A | 6/2010 |
| KR | 1020140035926 A | 3/2014 |
| WO | 2013011769 | * 1/2013 |

* cited by examiner

*Primary Examiner* — Stephanie Duclair
(74) *Attorney, Agent, or Firm* — Alleman Hall McCoy Russell & Tuttle LLP

(57) ABSTRACT

Provided is a metal-resin complex in which a metal alloy and a resin composition that are heterogeneous materials are integrated with each other, and more particularly, a method for producing a metal-resin complex capable of improving bonding strength by producing a metal alloy having a more uniform etching surface using an alkaline aqueous solution to which a chelating agent is added and an acid aqueous solution to which the chelating agent and an amic acid are added, and injection-molding the resin composition by using the produced metal alloy.

9 Claims, 4 Drawing Sheets

METHOD FOR PRODUCING METAL-RESIN COMPLEX

CROSS-REFERENCE TO RELATED APPLICATIONS

This application claims priority under 35 U.S.C. §119 to Korean Patent Application No. 10-2014-0151824, filed on Nov. 4, 2014, in the Korean Intellectual Property Office, the disclosure of which is incorporated herein by reference in its entirety.

TECHNICAL FIELD

The following disclosure relates to a metal-resin complex in which a metal alloy and a resin composition that are heterogeneous materials are integrated with each other, and more particularly, to a method for producing a metal-resin complex capable of improving bonding strength by producing a metal alloy having a more uniform etching surface, and injection-molding a resin composition by using the produced metal alloy.

BACKGROUND

A technology of integrating a metal alloy material and a resin material, which are heterogeneous materials, using an adhesive, has been used in many fields such as automobile, electronic products, industrial machines, and the like. However, using the adhesive has disadvantages of difficulty in performing precise bonding, long curing time, and difficulty in maintaining and managing a state of the adhesive.

Due to the above-mentioned reasons, methods of bonding the metal alloy material and the resin material which are heterogeneous materials, without using the adhesive, have been researched in the related art. As one of the methods, a nano method has been actively researched in recent years.

A bonding technology of the heterogeneous materials by the nano method is to form a nano-sized groove on a surface of the metal alloy material and insert the resin material into the groove, which has high tensile force as compared to the case of using the adhesive.

However, when being exposed under harsh conditions, bonding strength of the metal-resin complex is not sufficient, such that a metal-resin complex having more excellent bonding strength has been demanded to be developed.

RELATED ART DOCUMENT (Patent Document 1) Korean Patent Laid-Open Publication No. KR 10-2014-0035926
(Patent Document 2) Korean Patent Laid-Open Publication No. KR 10-2010-0063152

SUMMARY

An embodiment of the present invention is directed to providing a method for producing a metal-resin complex capable of improving bonding strength by producing a metal alloy having a more uniform and finer etching surface using an alkaline aqueous solution to which a chelating agent is added and an acid aqueous solution to which the chelating agent and an amic acid are added, and injection-molding a resin composition by using the produced metal alloy.

In one general aspect, a method for producing a metal-resin complex includes:
preparing a surface-etched metal alloy material; and
injection-molding a resin composition on a surface of the etched metal alloy material so that the metal alloy material and the resin composition are integrated with each other,
wherein the preparing of the surface-etched metal alloy material includes:
(i) a primary treatment process of treating the metal alloy material with an alkaline aqueous solution to which a chelating agent is added; and
(ii) a secondary treatment process of etching the metal alloy material with an acid aqueous solution to which the chelating agent and an amic acid are added.

Holes of the etched surface of the aluminum resin alloy material may have an average inner diameter of 0.1 to 10 µm, and an average surface roughness of the etched surface may be 50 to 200 µm.

The metal alloy may be any one selected from stainless steel (steel use stainless: SUS), an aluminum alloy, or a magnesium alloy.

The chelating agent may be added in an amount of 0.001 to 0.5 parts by weight based on 100 parts by weight of the alkaline aqueous solution or the acid aqueous solution.

The amic acid may be added in an amount of 0.01 to 0.1 parts by weight based on 100 parts by weight of the acid aqueous solution.

The primary treatment process may be performed under conditions of the alkaline aqueous solution having 1 to 10 wt % concentration, temperature of 30 to 70° C., and a treating time of 30 seconds to 2 minutes.

The secondary treatment process may be performed in three stages of a pre-acid treating process, an etching process, and a scale removing process.

The pre-acid treating process and the scale removing process may be performed under conditions of the acid aqueous solution having 10 to 30 wt % concentration, temperature of 40 to 80° C., and a treating time of 30 seconds to 2 minutes.

The etching process may be performed under conditions of the acid aqueous solution having 5 to 15 wt % concentration, temperature of 50 to 80° C., and an etching time of 3 to 10 minutes.

The preparing of the metal alloy material may further include a degreasing process as a pre-process of the primary treatment process.

Hereinafter, each component of the present invention will be described in detail.

A metal alloy of the present invention will be firstly described.

The metal alloy used in the present invention may be stainless steel (steel use stainless: SUS) manufactured by machine processing, an aluminum alloy, or a magnesium alloy.

The stainless steel including important elements such as chromium (Cr), nickel (Ni), carbon (C), and the like, in iron (Fe), and including columbium (Cb), titanium (Ti), thallium (TI), and the like, as an additive, has excellent corrosion resistance, high strength, fire resistance, thermal resistance, oxidation resistance, and wear resistance, and excellent workability.

The stainless steel is classified in view of a structure, and there are four kinds of ferritic, austenitic, martensitic, and precipitation hardening (PH type) stainless steels.

The ferritic stainless steel is a low carbon steel without nickel and includes chromium in an amount of 12 to 25 wt %, and may not be cured by heat treatment. Therefore, the ferritic stainless steel may be cured by cold working. The austenitic stainless steel referred to as a general stainless steel has excellent mechanical properties at high temperature and low temperature, and excellent corrosion resistance, acid resistance, and the like, and may be cured by heat treatment, and may have a small amount of nickel. The martensitic stainless steel has 0.1 to 0.35 wt % of carbon and 12 to 18 wt % of chromium, and may be cured by heat treatment, and may be largely used as a knife. The precipitation hardening (PH type) stainless steel was developed as a material without losing strength even at the time of increasing temperature, and is obtained by adding microalloying elements such as phosphorus, titanium, and the like, as precipitation element in a supersaturation state.

Examples of the stainless steel used in the present invention include all of the commercially available stainless steels such as SUS 304, SUS 430, SUS 403, and the like, but the present invention is not limited thereto.

The aluminum alloy may be divided into a non-heat treatment type alloy and a heat-treated alloy. As the non-heat treatment type alloy, which is to increase hardness and tensile strength only at the time of work-hardening, there are an Al—Mg based alloy, an Al—Mn based alloy, an Al—Mg≥Mn based alloy, and the like, and as the heat-treated alloy, which is to improve mechanical properties through heat-treatment, there are an Al—Cu—Mg based alloy, an Al—Zn—Mg based alloy, an Al—Mg—Si based alloy, a heat-resistant aluminum alloy, and the like.

Examples of the aluminum alloy used in the present invention include all of the commercially available aluminum or aluminum alloys such as A5052, A3003, A6063, and the like, but the present invention is not limited thereto.

The magnesium alloy may also be divided into a non-heat treatment type alloy for increasing hardness and tensile strength by machine-processing, followed by curing only, and a heat-treated alloy for improving mechanical properties by heat treatment, and may be divided into a die casting alloy.

The magnesium alloy used in the present invention may be all of the commercially available magnesium or all of the magnesium alloys including malleable alloys such as AZ31, and the like, and alloys for casting such as AZ91, and the like.

In addition, as the metal alloy applied to an exemplary embodiment of the present invention, a metal alloy processed as a component structure by machine-processing an intermediate metal material having a plate shape, a bar shape, a pipe shape, or the like, before processing, using a cutting processing method, a drawing processing method, a milling processing method, an electric-discharge processing method, a press processing method, a grinding processing method, a polishing processing method, or the like, may be used.

The component structure may be injected into an injection-molding mold to thereby be processed as a component having a shape and structure suitable for a specific product.

Next, a degreasing process according to the present invention will be described.

In general, foreign materials and oil components are adhered to a surface of a processed metal alloy, and these foreign materials and oil components need to be removed. In this case, at the time of removing the foreign materials and oil components, a neutral detergent may be used, or an ultrasonic degreasing method or an electrolytic degreasing method may be used.

As the neutral detergent, a detergent for a metal alloy has been sold on the market, but a dish detergent (containing a surfactant) used in ordinary homes may be used. However, in this case, it is preferable to clearly remove components of the used dish detergent, and the reason is that when the dish detergent component remains, the remaining components may inhibit the primary and secondary treatment processes.

Next, the primary treatment process according to the present invention will be described.

In the present invention, the primary treatment process, which is to remove a protective film such as a metal oxide film, or the like, and activate a surface, allows an acid to be uniformly reacted in the subsequent secondary treatment process and decreases a process time.

The primary treatment process is a step of removing an oxide film, or the like, of the metal alloy using the alkaline aqueous solution to which the chelating agent is added, and the treatment method is not particularly limited. For example, the oxide film, or the like, may be removed by dipping the metal alloy in the alkaline aqueous solution to which the chelating agent is added or allowing the alkaline aqueous solution to flow on the metal alloy.

In addition, it is preferable that the primary treatment process is preferably performed under conditions of the alkaline aqueous solution having 1 to 10 wt % concentration, a solution temperature of 30 to 70° C., and a treatment time of 30 seconds to 2 minutes. The protective film such as an aluminum oxide film, or the like, may be effectively removed within the above-mentioned ranges.

The alkaline aqueous solution is not particularly limited, but a sodium hydroxide aqueous solution, a potassium hydroxide aqueous solution, or a magnesium hydroxide aqueous solution may be used.

In the present invention, the chelating agent is preferably added in an amount of 0.001 to 0.5 parts by weight, preferably 0.005 to 0.2 parts by weight, and more preferably, 0.01 to 0.1 parts by weight based on 100 parts by weight of the alkaline aqueous solution. The protective film such as the metal oxide film, or the like, may be more effectively and rapidly removed within the above-mentioned range.

The chelating agent is not particularly limited as long as it is generally used. For example, ethylenediaminetetraacetic acid (EDTA), diethylenetriaminepentaacetic acid (DTPA), nitrilotriacetic acid (NTA), (2-hydroxyethyl)-ethylenediaminetriacetic acid (HEDTA) ethylenebis(oxyethylenenitrilo) tetraacetic acid (EGTA), or the like, may be used.

Next, the secondary treatment process according to the present invention will be described.

In the present invention, the secondary treatment process is a step of forming an etching surface on the surface of the metal alloy, and although not particularly limited, the etching surface may have an average inner diameter of 0.1 to 10 μm and an average surface roughness of 50 to 200 μm. An anchor effect is high in the above-mentioned average inner diameter and average surface roughness ranges, such that adhesion force is excellent, and strength of the metal alloy itself is not deteriorated.

The secondary treatment process is performed in three stages of a pre-acid treating process, an etching process, and a scale removing process, and the treatment method is not particularly limited. For example, the surface may be etched by dipping the metal alloy into the acid aqueous solution or allowing the acid aqueous solution to flow on the metal alloy.

The pre-acid treating process is a step of forming the etching surface of the metal to be finer, and is performed by adding a chelating agent and an amic acid to an acid aqueous solution having 10 to 30 wt % concentration to treat the metal alloy, wherein it is preferred that the acid aqueous solution has a temperature of 40 to 80° C., and a treatment time is 30 seconds to 2 minutes.

The etching process is a step of forming the etching surface having a groove part and a protrusion part on the metal surface, and is performed by adding a chelating agent and an amic acid to an acid aqueous solution having 5 to 15 wt % concentration to treat the metal alloy, wherein it is preferred that the acid aqueous solution has a temperature of 50 to 80° C., and an etching time is 3 to 10 minutes.

The scale removing process is a step of removing foreign materials generated after the etching surface is formed, and is performed by adding a chelating agent and an amic acid to an acid aqueous solution having 10 to 30 wt % concentration to treat the metal alloy, wherein it is preferred that the acid aqueous solution has a temperature of 40 to 80° C., and an etching time is 30 seconds to 2 minutes.

Acids used in the three stages of the secondary treatment process in the present invention are not particularly limited, but hydrochloric acid, nitric acid, sulfuric acid or formic acid may be used.

In the present invention, the chelating agent is preferably added in a range of 0.001 to 0.5 parts by weight, preferably 0.005 to 0.2 parts by weight, and more preferably, 0.01 to 0.1 parts by weight based on 100 parts by weight of the acid aqueous solution. The etching surface may be more uniformly and finely formed in the above-mentioned range of the chelating agent, such that bonding strength is improved, and there is no defect such as a void, or the like, on the bonding surface at the time of injection-bonding the resin.

The chelating agent is not particularly limited as long as it is generally used. For example, ethylenediaminetetraacetic acid (EDTA), diethylenetriaminepentaacetic acid (DTPA), nitrilotriacetic acid (NTA), (2-hydroxyethyl)-ethylenediaminetriacetic acid (HEDTA) ethylenebis(oxyethylenenitrilo)tetraacetic acid (EGTA), or the like, may be used, and the chelating agent added to the acid aqueous solution equal to or different from the chelating agent added to the alkaline aqueous solution may be selected and used.

The amic acid in the present invention may be preferably added in an amount of 0.01 to 0.1 parts by weight based on 100 parts by weight of the acid aqueous solution, and in the above-mentioned range of the amic acid, the etching surface may be more uniformly and finely formed, such that bonding strength is significantly improved, and there is no defect such as a void, or the like, on the bonding surface at the time of injection-molding and bonding the resin.

The amic acid is not particularly limited. For example, glycine, glutamic acid, aspartic acid, serine, threonine, or the like, may be used, and the present invention is not limited thereto.

Next, the resin composition according to the present invention will be described.

In the present invention, the resin material is not particularly limited. For example, polyamide (PA) resins such as nylon 6, nylon 66, and the like, polyphthalamide (PPA) resins, polybutylene terephthalate (PBT) resins, or polyphenylene sulfide (PPS) resins are preferably used, and one resin may be used alone or a combination of two or more resins thereof may be used. In the case of using the combination of two or more resins, all combinations in which two or more resins are simply mixed with or molecularly bonded to each other may be used.

In addition, the metal-resin complex according to the present invention may further contain 1 to 200 parts by weight, more preferably, 10 to 150 parts by weight of a filler based on 100 parts by weight of the total resin material in order to adjust a difference in linear expansion rate between a metal alloy part and a resin part and to improve mechanical strength of the resin part.

As the filler, there are a fibrous filler, a granular filler, a plate-like filler, and the like. As the fibrous filler, there are glass fiber, carbon fiber, aramid fiber, and the like, and as a specific example of the glass fiber, there is a chopped strand having an average fiber diameter of 6 to 14 µm. As the granular filler or plate-like filler, there are calcium carbonate, mica, glass flake, glass balloon, magnesium carbonate, silica, talc, clay, a pulverized material of carbon fiber or aramid fiber, and the like.

Next, the injection-molding according to the present invention will be described.

After preparing an injection-molding mold, opening an upper mold (movable mold), and injecting the processed metal alloy into a lower mold (fixed mold), the upper mold is closed.

Thereafter, in the case of injection-molding the produced resin composition into the mold, the metal alloy and the resin composition, which are heterogeneous materials, are bonded to each other, such that the metal-resin complex in which the metal alloy and the resin composition are integrated with each other may be obtained.

In order to increase bonding force, it is preferable that a mold temperature is raised to be slightly higher than a temperature at the time of molding a general resin material. Therefore, the mold temperature is changed depending on the kind of resin, but in general, it is preferable that the mold temperature is 120 to 350° C.

DETAILED DESCRIPTION OF EMBODIMENTS

Figure 1:
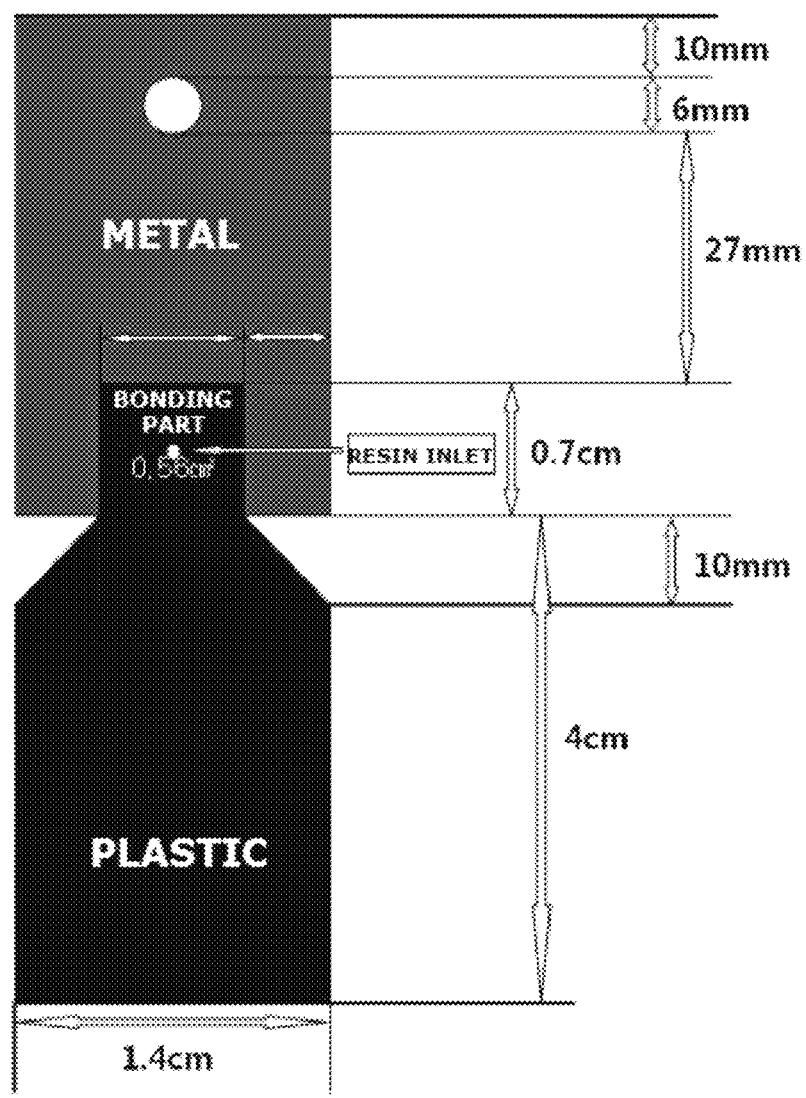
FIG. 1 is a cross-sectional view showing a metal-resin complex according to an exemplary embodiment of the present invention.
Figure 2:
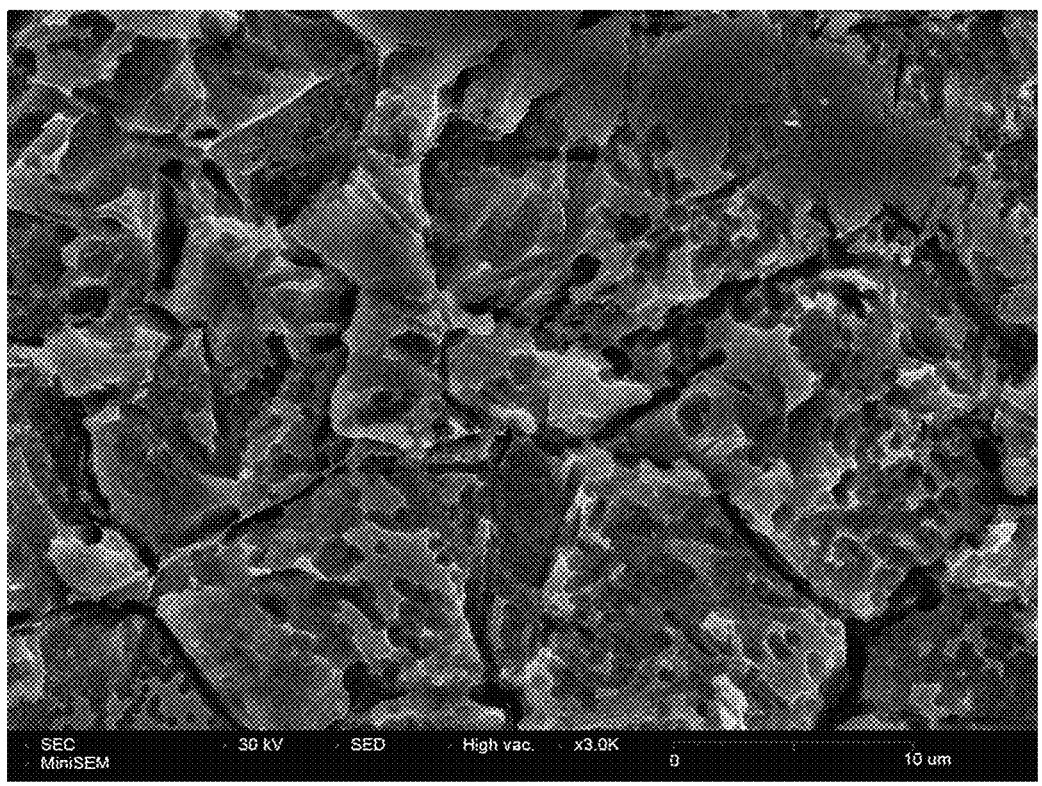
FIG. 2 is an enlarged photo obtained by coating a surface of stainless steel of Example 1 of the present invention with platinum so as to clear the surface, and observing the stainless steel magnified by 3,000 using an electron microscope.
Figure 3:
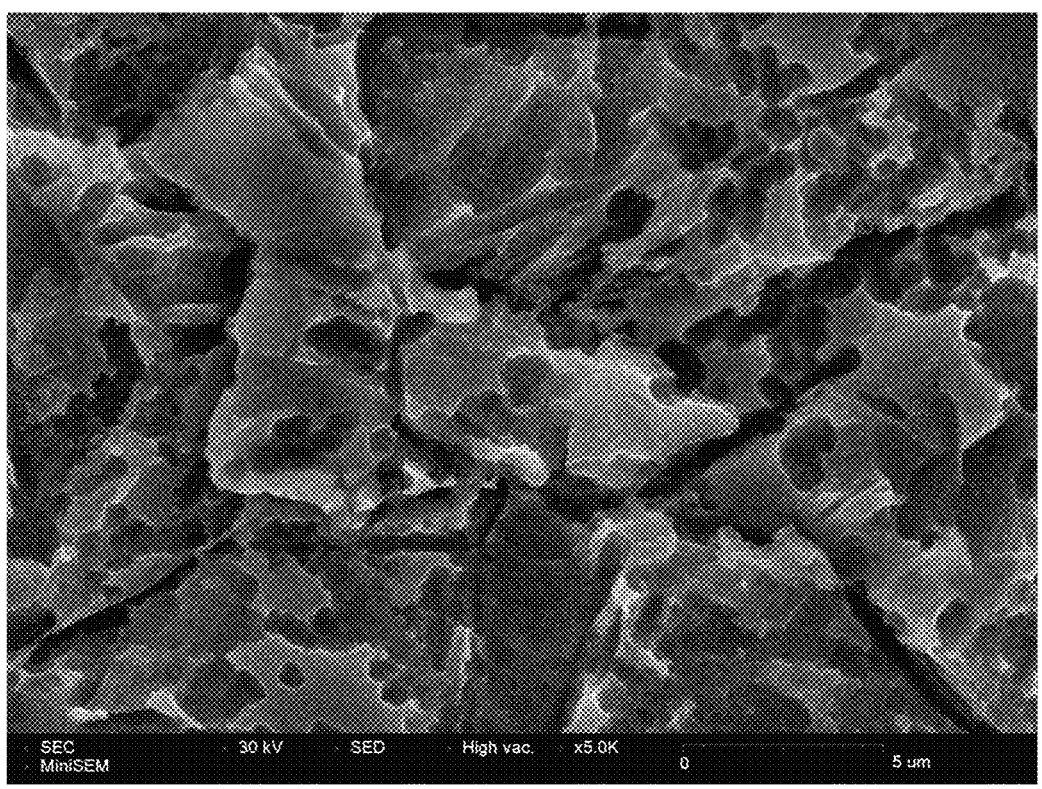
FIG. 3 is an enlarged photo obtained by coating a surface of the stainless steel of Example 1 of the present invention with platinum so as to clear the surface, and observing the stainless steel at magnified by 5,000 using an electron microscope.
Figure 4:
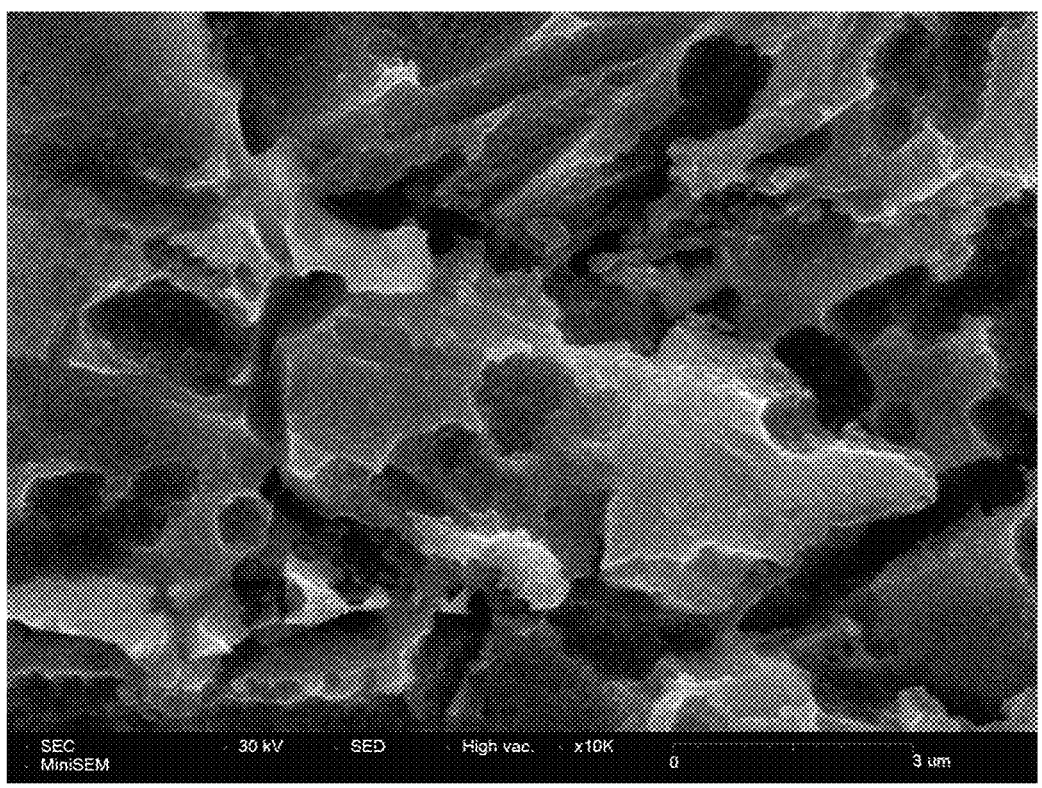
FIG. 4 is an enlarged photo obtained by coating a surface of the stainless steel of Example 1 of the present invention with platinum so as to clear the surface, and observing the stainless steel at magnified by 10,000 using an electron microscope.

Hereinafter, a method for producing a metal-resin complex according to the present invention will be described in detail with reference to Examples. Meanwhile, the following exemplary embodiments and examples are provided as a reference for explaining the present invention in detail, and therefore, the present invention is not limited thereto, but may be implemented in various ways.

Unless defined otherwise, all technical and scientific terms used herein have the same meanings generally understood by those skilled in the art to which the present invention pertains. Terms used in the specification of the present invention are to effectively describe specific exemplary embodiments, but are not intended to limit the present invention.

In addition, the drawings to be described below are provided by way of example so that the idea of the present invention can be sufficiently transferred to those skilled in the art to which the present invention pertains. Therefore, the present invention may be implemented in many different forms, without being limited to the drawings to be described below. The drawings may be exaggerated in order to specify the spirit of the present invention.

It is intended that singular forms used in the appended specification and claims include plural forms unless otherwise indicated in the context.

In addition, additives are used in unit of wt % unless specifically described in the specification.

Physical properties of the metal-resin complexes produced by the following Examples and Comparative Examples were measured as follows.

(Measurement of Shear Fracture Force)

Shear fracture force of metal-resin complexes produced in Examples was measured at a tensile speed of 10 mm/min using a universal tensile tester (Instron 3343).

Example 1

A commercially available SUS 304 alloy plate having a thickness of 1.0 mm was purchased and cut into a plurality of rectangular pieces (14.0 mm×50.0 mm).

After forming a hole having a diameter of 6 mmΦ in an end portion of the cut SUS alloy piece using a press, a jig made of a titanium wire was prepared, and 10 cut SUS alloy pieces were seated on the jig made of the titanium wire so that they did not collide with each other.

Then, a solution in which 0.3 g of EDTA was added to 1 L of 5 wt % NaOH aqueous solution was prepared, and the alloy piece was dipped therein at a solution temperature of 50° C. for 1 minute and then washed.

After a primary treatment process, a solution in which 0.3 g of EDTA and 0.3 g of glycine were added to 1 L of 20 wt % HCl aqueous solution was prepared, and the metal alloy piece was pre-acid treated by dipping it at a solution temperature of 60° C. for 1 minute and then washed.

Next, a solution in which 0.3 g of EDTA and 0.3 g of glycine were added to 1 L of 10 wt % $H_2SO_4$ aqueous solution was prepared, and the metal alloy piece was dipped therein at a solution temperature of 70° C. for 5 minutes to be etched, and washed.

As a final step of a secondary treatment process, a solution in which 0.3 g of EDTA and 0.3 g of glycine were added to 1 L of 20 wt % HCl aqueous solution was prepared, and the metal alloy piece was dipped therein at a solution temperature of 60° C. for 1 minute to remove scales, and then washed and dried.

Next, after taking the obtained SUS alloy piece out of the jig and putting and storing the metal alloy piece in a poly bag for 2 days, the stored metal alloy piece was picked out and injected using upper and lower molds of an injection-molding mold. Then, a polyphthalamide resin (EMS-Chemie Holding AG, GVS-5H) was injection-molded into the mold, thereby obtaining a complex in which the SUS alloy and the resin composition were integrated with each other. In this case, an injection temperature was 300° C., and a mold temperature was 180° C. Further, as shown in the cross-sectional view of FIG. 1, the produced SUS-resin complex had a SUS alloy part (1.0 mm×50.0 mm×14.0 mm, thickness×length×width), a resin part (3.0 mm×47.0 mm×14.0 mm), and a bonding part (4.0 mm×7.0 mm×8.0 mm), and an area of the bonding part was 0.56 $cm^2$.

After 2 days, a tensile fracture test was performed on 10 samples using a tensile fracture tester, and as a result, average shear fracture force was 40.4 MPa.

Example 2

The same processes as those in Example 1 were performed except for performing a degreasing process as a pre-process of the primary treatment process In the degreasing process, foreign materials such as oil components, or the like, were removed by immersing a SUS alloy piece in a commercially available dish detergent (for example, PongPong) washing solution.

The same subsequent processes as those in Example 1 were performed, such that a complex in which the SUS alloy and the resin composition were integrated with each other was obtained.

After 2 days, a tensile fracture test was performed on 10 samples using a tensile fracture tester, and as a result, average shear fracture force was 41.0 MPa.

Comparative Example 1

The same processes as those in Example 1 were performed except that EDTA and an amic acid were not added in the primary and secondary treatment processes.

After 2 days, a tensile fracture test was performed on 10 samples using a tensile fracture tester, and as a result, average shear fracture force was 32.8 MPa.

Comparative Example 2

The same processes as those in Example 1 were performed except that an amic acid was not added in the secondary treatment process.

After 2 days, a tensile fracture test was performed on 10 samples using a tensile fracture tester, and as a result, average shear fracture force was 33.3 MPa.

Comparative Example 3

The same processes as those in Example 1 were performed except that EDTA was not added in the primary treatment process.

After 2 days, a tensile fracture test was performed on 10 samples using a tensile fracture tester, and as a result, average shear fracture force was 33.7 MPa.

With the method for producing the metal-resin complex according to the present invention, bonding strength may be improved by producing the metal alloy having a more uniform etching surface using an alkaline aqueous solution to which the chelating agent is added and an acid aqueous solution to which the chelating agent and the amic acid are added, and injection-molding the resin composition by using the produced metal alloy.

What is claimed is:

1. A method for producing a metal-resin complex comprising:
   preparing a surface-etched metal alloy material; and
   injection-molding a resin composition on a surface of the etched metal alloy material so that the metal alloy material and the resin composition are integrated with each other,
   wherein the preparing of the surface-etched metal alloy material includes:

(i) a primary treatment process of treating the metal alloy material with an alkaline aqueous solution to which a chelating agent is added; and
(ii) a secondary treatment process of etching the metal alloy material with an acid aqueous solution to which the chelating agent and an amic acid selected from glycine, glutamic acid, aspartic acid, serine, and threonine are added, and wherein the surface of the etched metal alloy material has an average inner diameter of 0.1 to 10 μm and an average surface roughness of 50 to 200 μm.

2. The method of claim 1, wherein the metal alloy material is any one selected from steel use stainless (SUS), an aluminum alloy, or a magnesium alloy.

3. The method of claim 1, wherein the chelating agent is added in an amount of 0.001 to 0.5 parts by weight based on 100 parts by weight of the alkaline aqueous solution or the acid aqueous solution.

4. The method of claim 1, wherein the amic acid is added in an amount of 0.01 to 0.1 parts by weight based on 100 parts by weight of the acid aqueous solution.

5. The method of claim 1, wherein the primary treatment process is performed under conditions of the alkaline aqueous solution having 1 to 10 wt % concentration, temperature of 30 to 70° C., and a treating time of 30 seconds to 2 minutes.

6. The method of claim 1, wherein the secondary treatment process is performed in three stages of a pre-acid treating process, an etching process, and a scale removing process.

7. The method of claim 6, wherein the pre-acid treating process and the scale removing process are performed under conditions of the acid aqueous solution having 10 to 30 wt % concentration, temperature of 40 to 80° C., and a treating time of 30 seconds to 2 minutes.

8. The method of claim 6, wherein the etching process is performed under conditions of the acid aqueous solution having 5 to 15 wt % concentration, temperature of 50 to 80° C., and a treating time of 3 to 10 minutes.

9. The method of claim 1, wherein the preparing of the metal alloy material further includes a degreasing process as a pre-process of the primary treatment process.

\* \* \* \* \*